United States Patent [19]

Humphrey

[11] 4,131,333

[45] * Dec. 26, 1978

[54] OPTICAL STABILIZER HAVING SPACE REFERENCED MOTION

[75] Inventor: William E. Humphrey, Oakland, Calif.

[73] Assignee: Optical Research and Development Corporation, Pleasant Hill, Calif.

[*] Notice: The portion of the term of this patent subsequent to Jan. 16, 1990, has been disclaimed.

[21] Appl. No.: 693,617

[22] Filed: Jun. 7, 1976

Related U.S. Application Data

[60] Division of Ser. No. 298,050, Oct. 16, 1972, Pat. No. 3,964,817, which is a continuation-in-part of Ser. No. 75,965, Sep. 28, 1970, Pat. No. 3,711,178, and Ser. No. 215,485, Jan. 5, 1972, Pat. No. 3,761,157.

[51] Int. Cl.² .................................................. G02B 23/02
[52] U.S. Cl. ................................................................ 350/16
[58] Field of Search ........................................... 350/16

[56] References Cited

U.S. PATENT DOCUMENTS

| 3,434,771 | 3/1969 | Alvarez | 350/16 |
| 3,677,618 | 7/1972 | Schwemin | 350/16 |
| 3,711,178 | 1/1973 | Humphrey | 350/16 |
| 3,761,157 | 9/1973 | Humphrey | 350/16 |

Primary Examiner—Jon W. Henry
Attorney, Agent, or Firm—Townsend and Townsend

[57] ABSTRACT

An optical ray deflecting means is neutrally supported in and biased in alignment with a window in a fluid filled chamber. The fluid, acting on both the sidewalls of the chamber and the surfaces of the deflecting means, causes the deflecting means to undergo proportional angular motion with respect to an inertial reference system when the chamber is subjected to vibrational angular motion with respect to the reference system. Placement of a deflecting means stabilizer at preselected points along the optical path of an optical instrument having high magnification is disclosed for producing instrument image stabilization.

4 Claims, 21 Drawing Figures

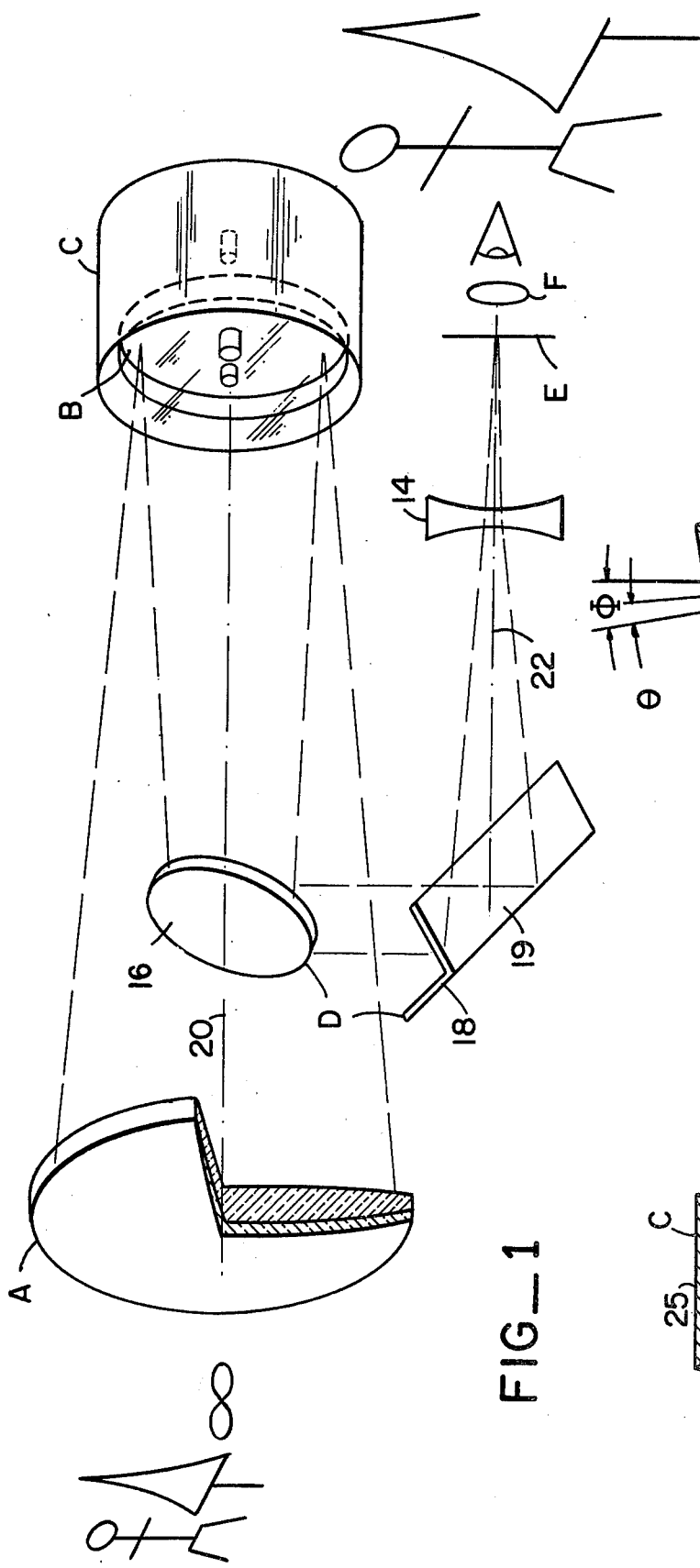
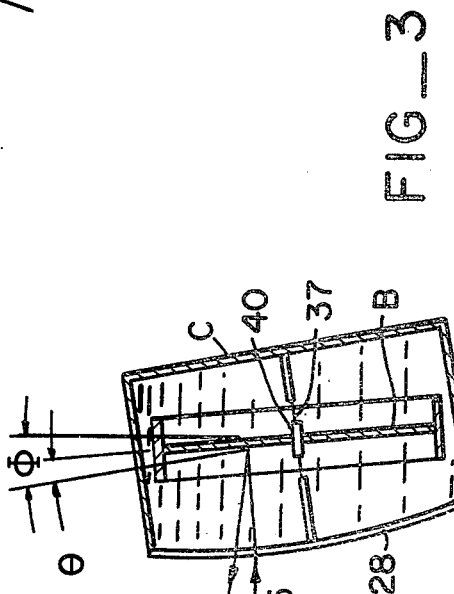
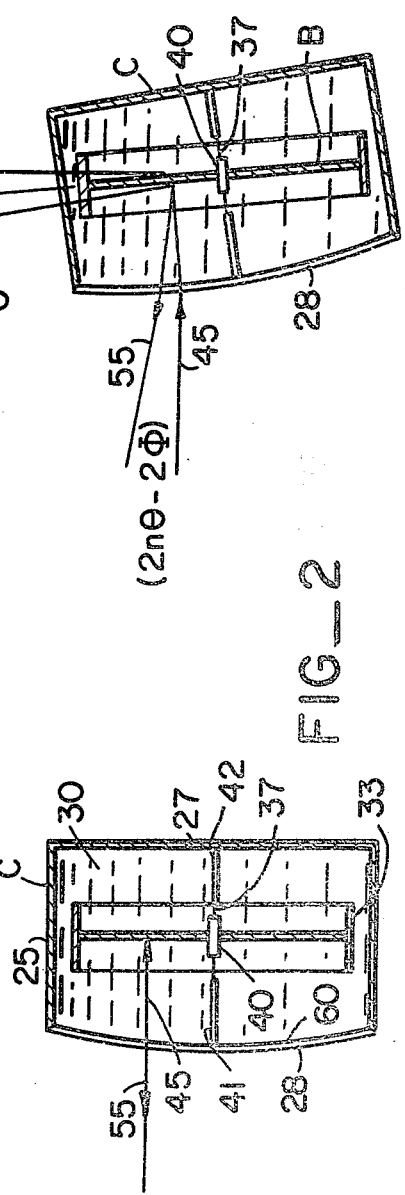

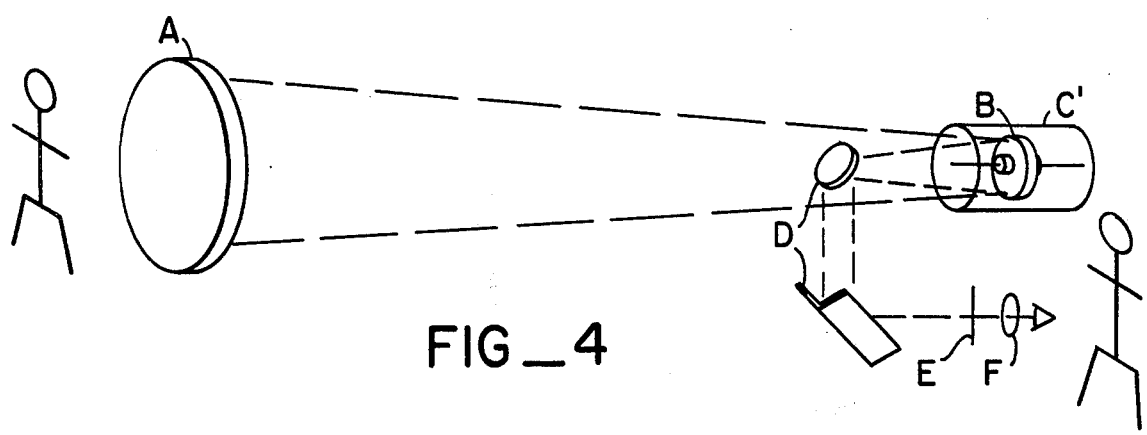
FIG_4
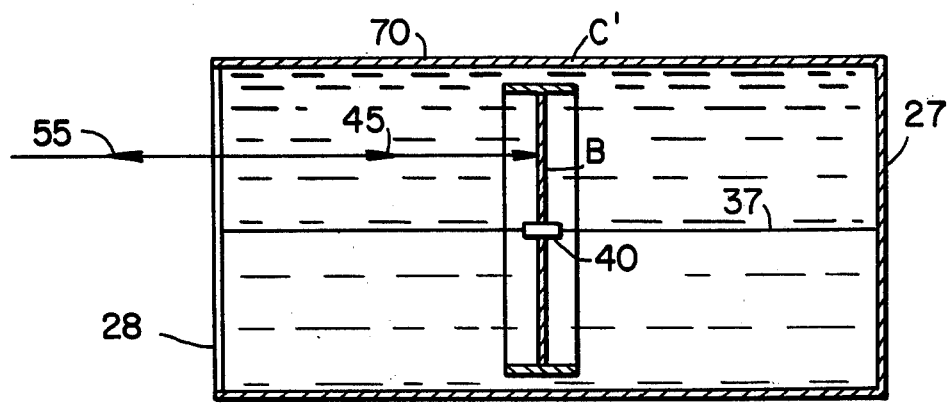
FIG_5
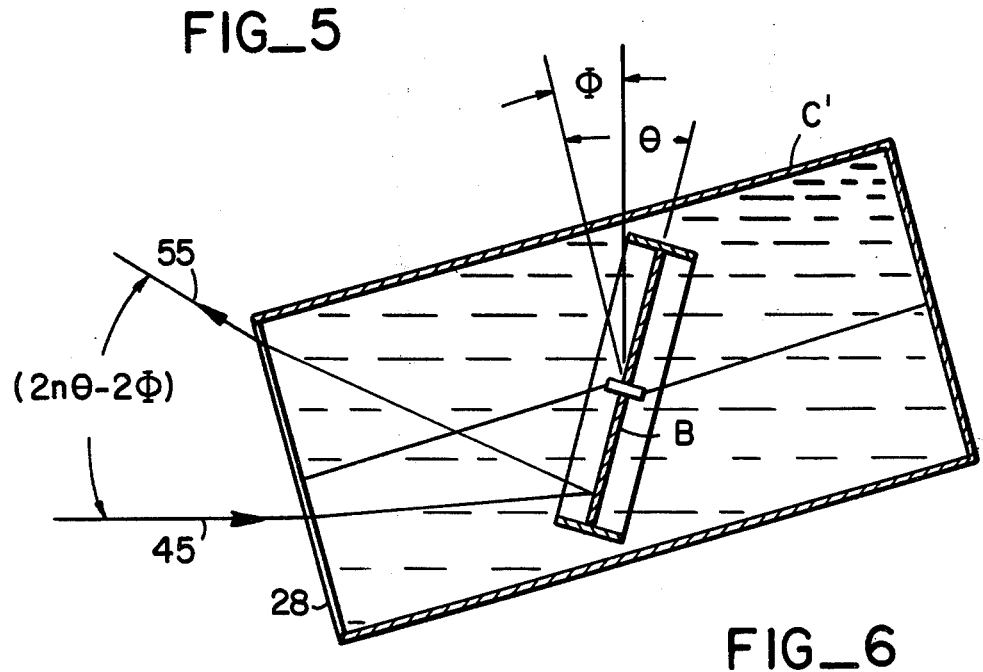
FIG_6

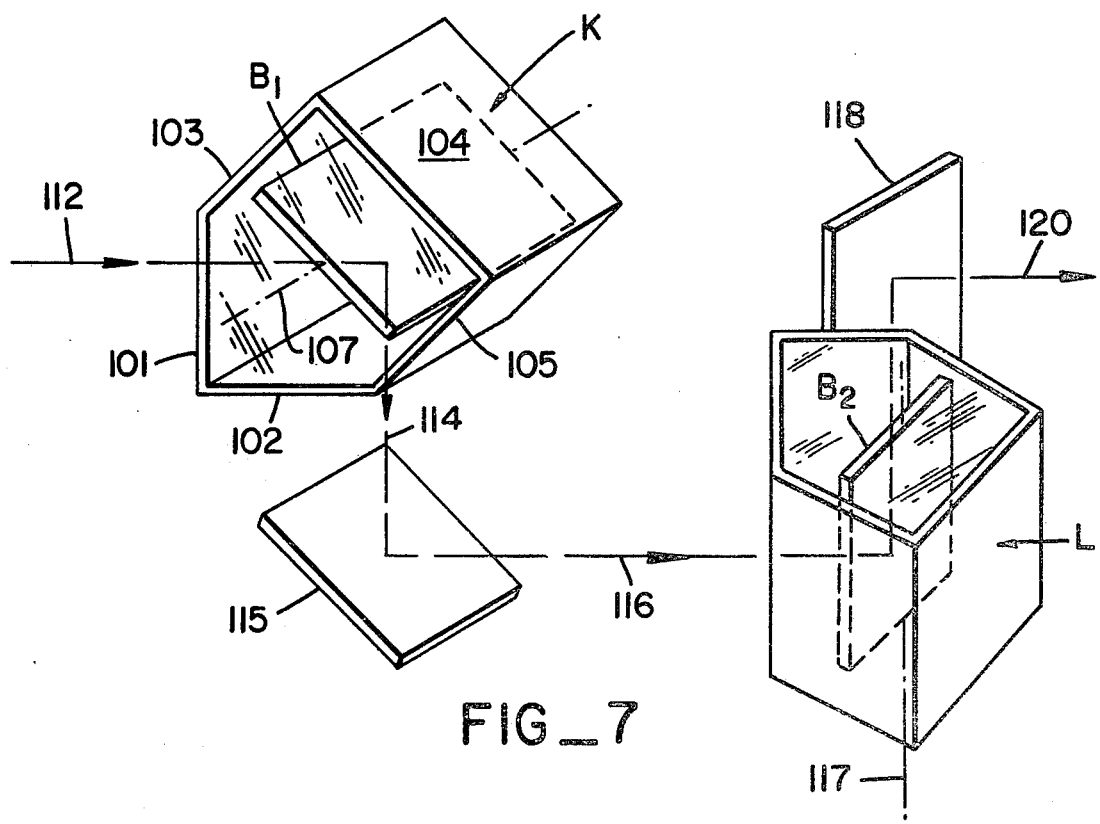
FIG_7
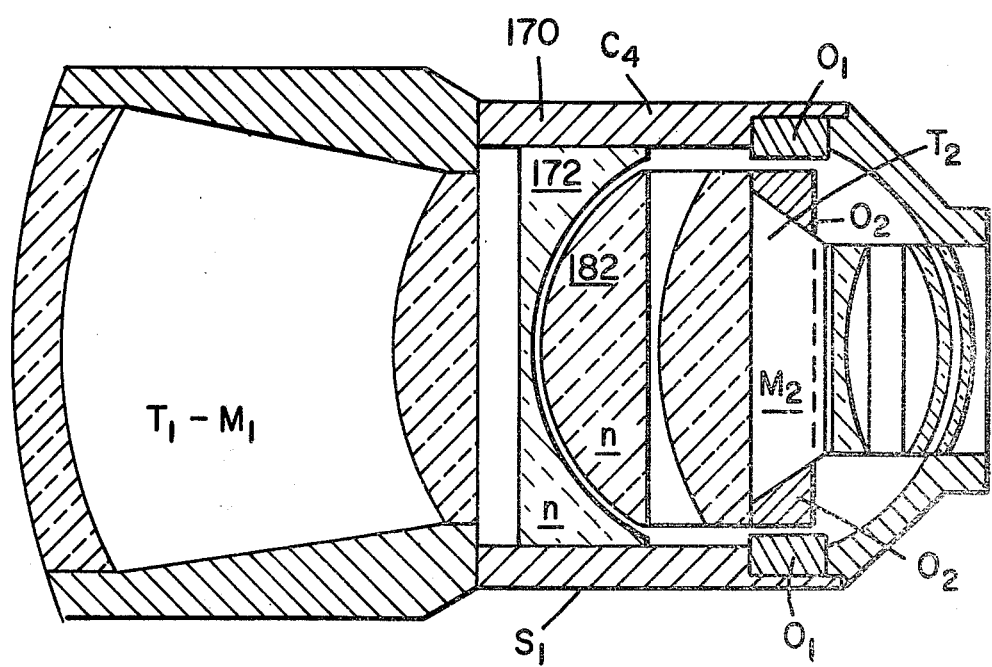
FIG_18

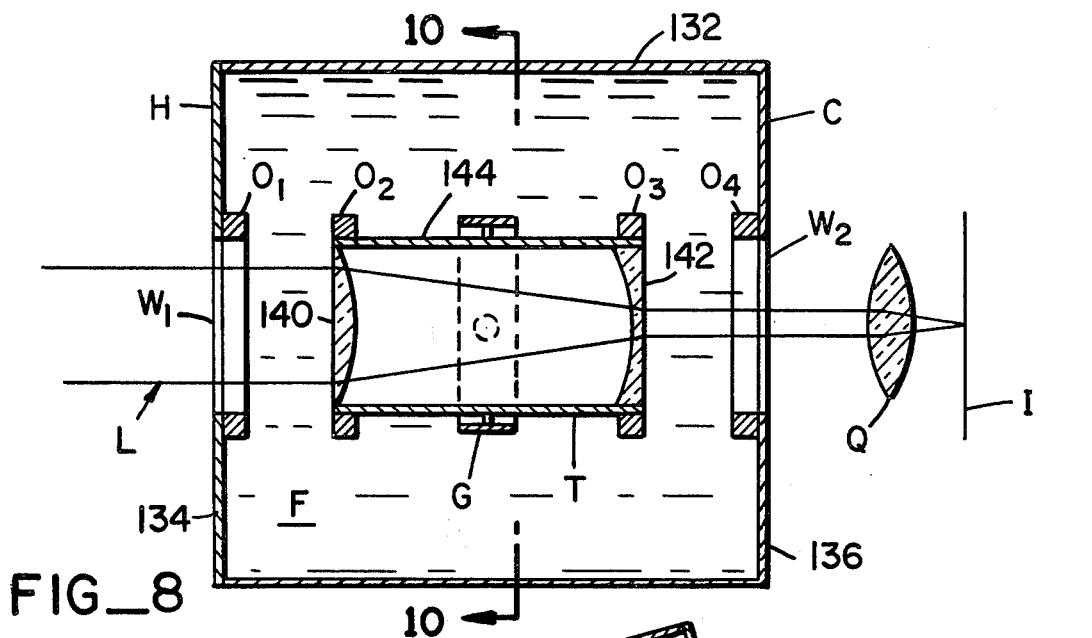
FIG_8
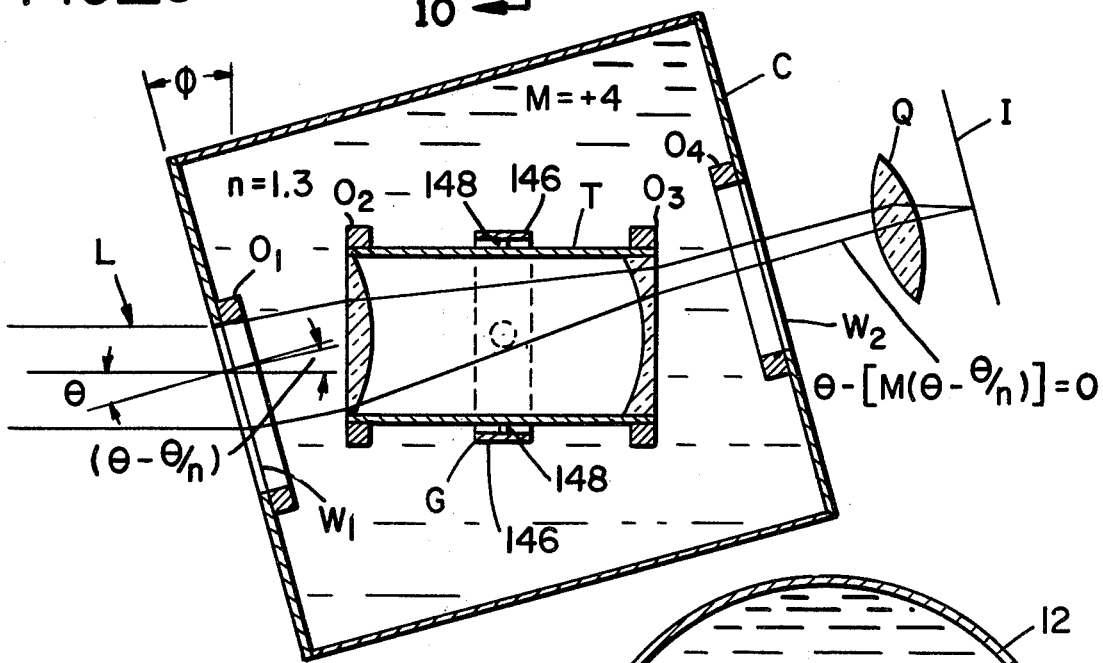
FIG_9
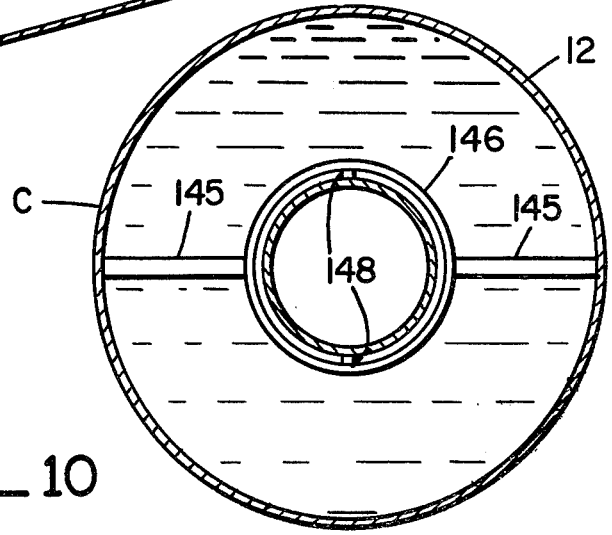
FIG_10

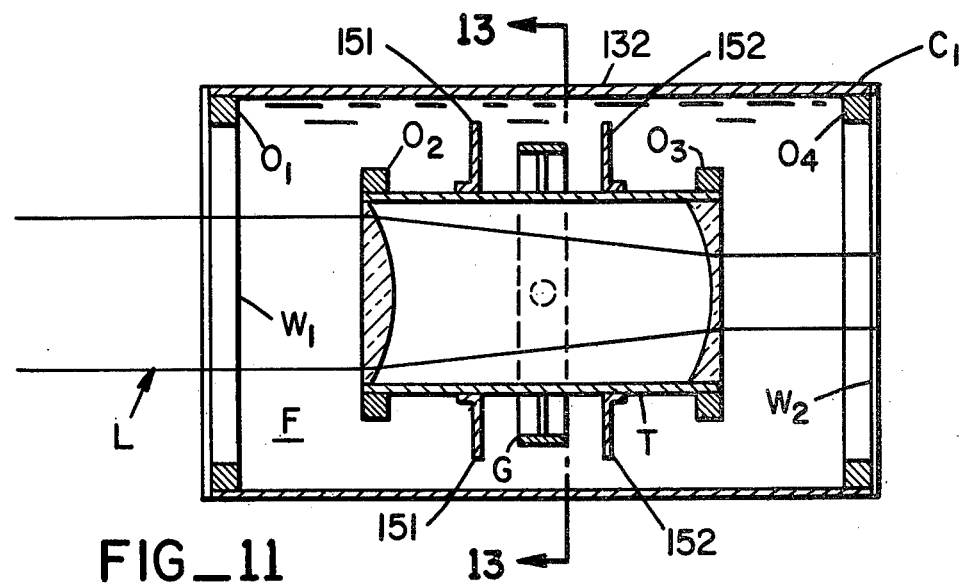
FIG_11
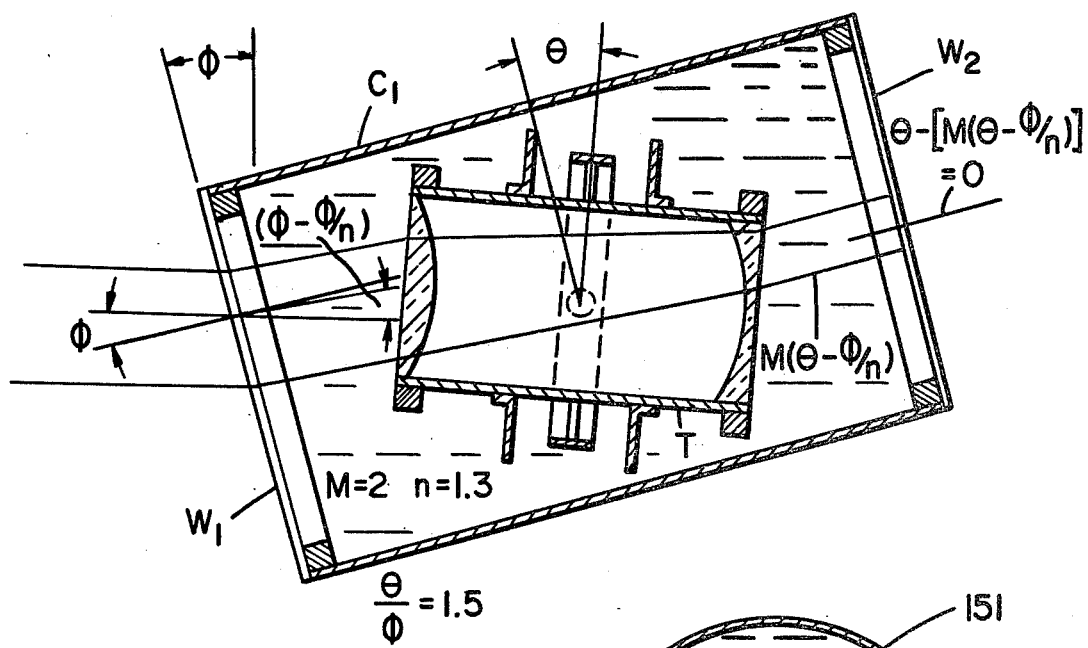
FIG_12
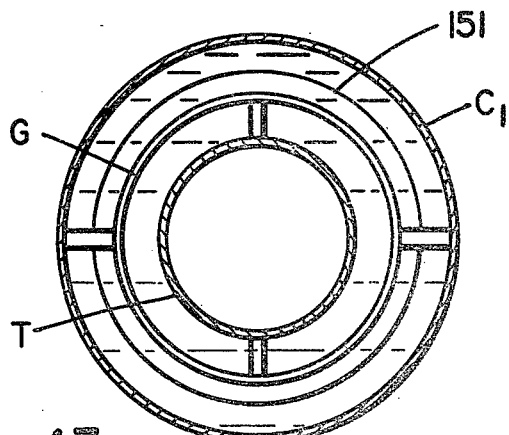
FIG_13

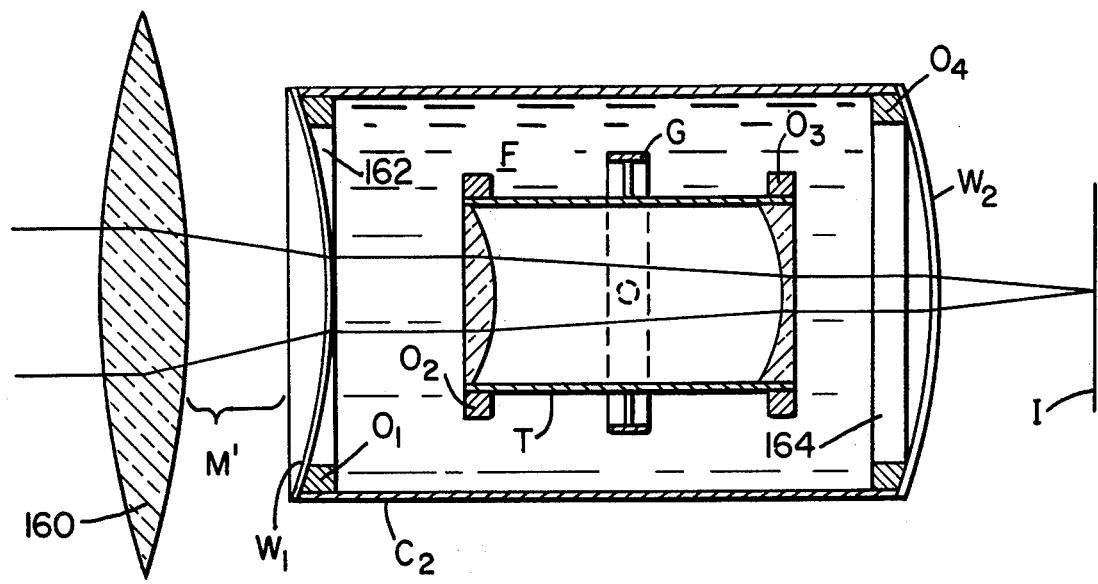
FIG_14
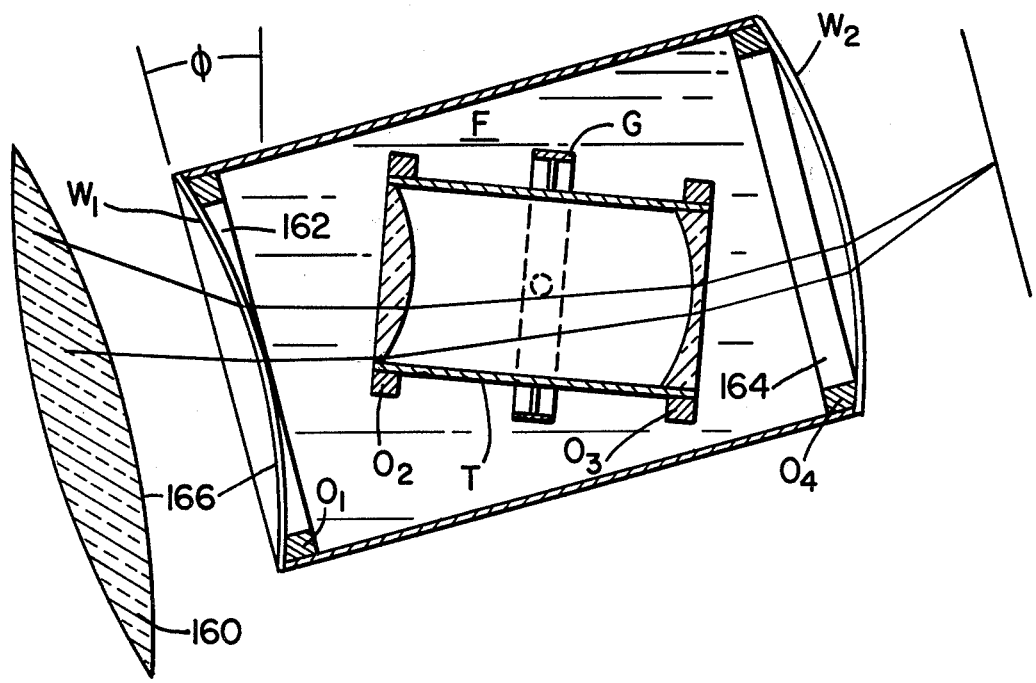
FIG_15

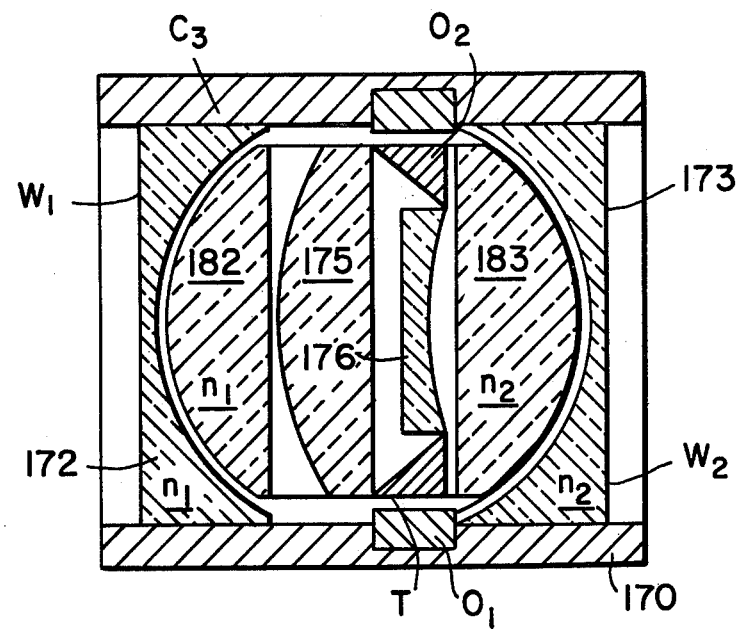
FIG_16
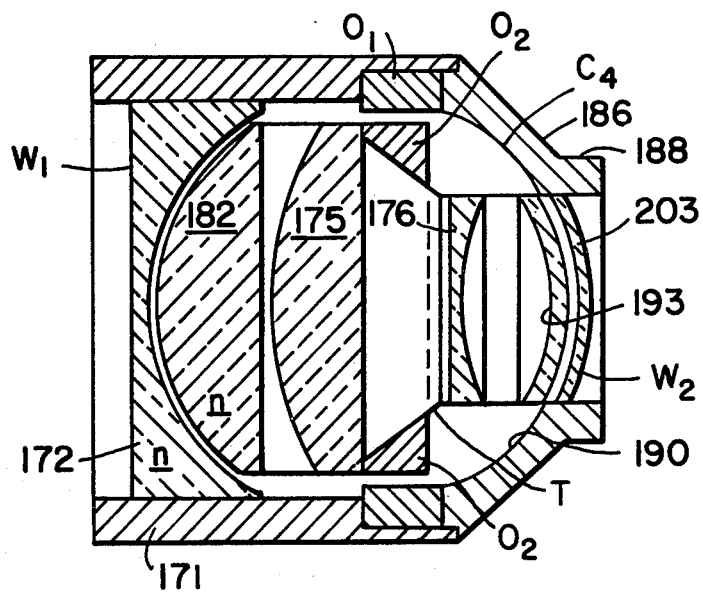
FIG_17

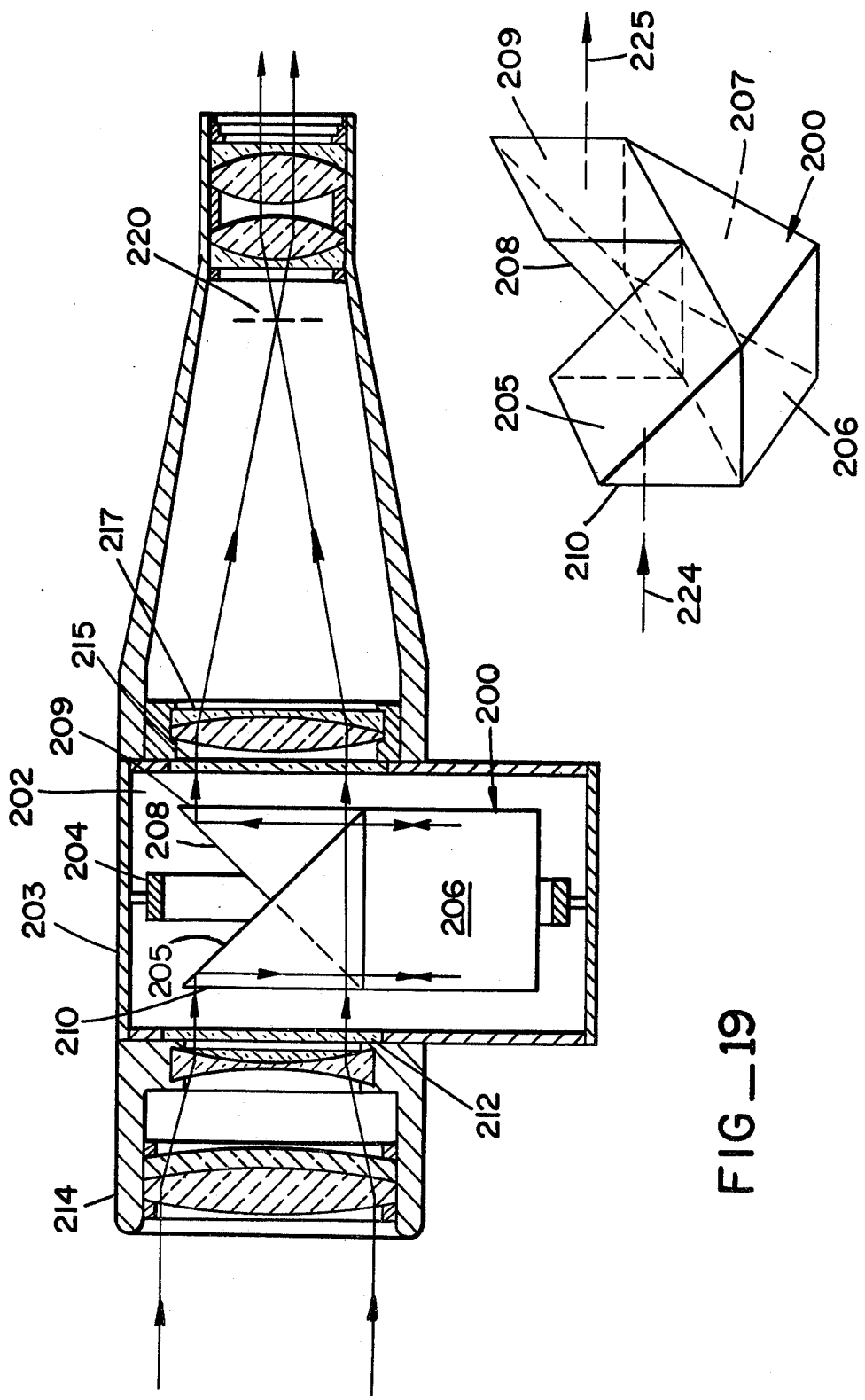
FIG_19
FIG_20

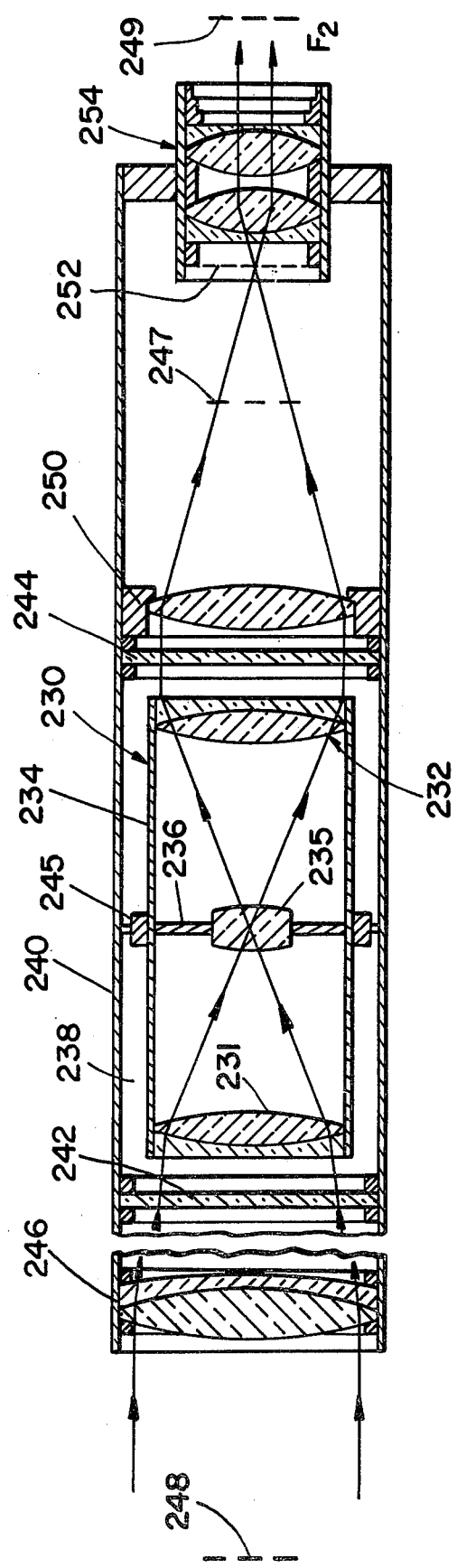
FIG_21

OPTICAL STABILIZER HAVING SPACE REFERENCED MOTION

This application is a division of U.S. Pat. No. 3,964,817, issued June 22, 1976, entitled OPTICAL STABILIZER HAVING SPACE REFERENCED MOTION (filed Oct. 16, 1972, Ser. No. 298,050), that application being a continuation in part of U.S. Pat. No. 3,711,178, issued Jan. 16, 1973, entitled MIRROR STABILIZER HAVING SPACE REFERENCED MOTION (filed Sept. 28, 1970, Ser. No. 75,965) and U.S. Pat. No. 3,761,157, issued Sept. 25, 1973, entitled IMMERSED TELESCOPE STABILIZER (filed Jan. 5, 1972, Ser. No. 215,485).

BACKGROUND OF THE INVENTION

This invention relates to optical stabilizers for damping ambient vibrations from optical instruments such as mirrors, hand held telescopes of high power and other light deflective devices. More particularly, the present invention relates to a hydrostatically supported optical instrument which is proportionally fluid coupled to a reference coordinate system or orientation in space during instrument vibration. Several embodiments of the invention are disclosed. In a first embodiment, the relationship between the placement of the stabilizer in the optical train, the power of the optical train, and the proportional couple of a mirror to space is disclosed. In another embodiment, the relationship between the power of a telescope, the index of refraction of the fluid bath, the power of the remainder of the optical train and the proportional couple of the telescope to a reference coordinate system is disclosed.

It is already known to inertially stabilize a two-power optical train by placing a stabilized mirror between the objective lens and the imaging plane of an instrument. Moreover, such mirrors, typically supported in fluid filled chambers, remain stationary with respect to space when the instrument undergoes vibration or rapid angular movement (as distinguished from panning). (See my U.S. Pat. No. 3,532,409 entitled "HYDROSTATICALLY SUPPORTED OPTICAL STABILIZER" issued Oct. 10, 1970.)

An object of the present invention is to provide a space referenced couple through fluid between a mirror on one hand and the chamber sidewalls on the other hand so that the mirror undergoes a proportional movement with reference to space when the chamber is moved with reference to space. By selecting the optics of the immersed telescope and the indices of refraction of the fluid bath, stabilizing image deflection can be obtained.

An advantage of this invention is that the stabilizer can be used with optical instruments having a wide variety of design configurations.

An additional advantage of this invention is that where powers of greater than two are desired, a two-power imaging optical train followed by a higher powered viewing optical train is not required. The number of positive lenses used is thus reduced with resultant reduction of curvature of field and chromatic aberrations.

An additional object of this invention is to utilize the index of refraction of the mirror supporting fluid to obtain the desired angular reflection of the stabilized light.

An advantage of utilizing this index of refraction is that even in the case where the optical instrument remains stationary with respect to a spatial reference during angular movement of the chamber in space, the indices of refraction can be used to increase the deflection generated by the motion of the casing containing the optical instrument.

An additional object of this invention is to disclose a series of optical instrument and chamber configurations where the resultant fluid couple will permit the stabilizer to be mounted at locations off of the midpoint between an objective lens and imaging point along an optical train.

An advantage of this controllable fluid couple is that the stabilizer can be located to complement the design of the optical path. Optical path dimensioning relative to the location of the stabilizer is no longer required.

A further object of this invention is to provide an optical instrument and chamber fluid couple where the optical instrument moves at a rate proportional and opposite to the angular vibrational rate of the chamber with respect to an orientation in space. This can be achieved by constructing a chamber with an elongate section along the optical axis through the chamber.

An advantage of this optical design is that a mirror can be placed relatively close to the focal plane or eyepiece of the stabilized instrument.

A further object of the invention is to provide an optical instrument and chamber fluid couple where the optical instrument moves at a rate in the same sense and less than the angular vibrational rate of the chamber with respect to an orientation in space. This can be achieved by constructing a chamber with an elongate section normal to the optic axis of the optical instrument.

An advantage of this configuration is that a mirror can be placed in a position adjacent the objective lens. In this location, small mirror movement produces large corresponding image stabilizing movement.

A further advantage of this chamber construction is that the small mirror movement giving large corresponding image stabilizing movement produces less inclination of the image plane with resultant reductions in distortion during instrument image stabilization.

A further object of this invention is to athermalize the focal length of the optical path between the objective and imaging plane. Accordingly, a small positive lens of fluid is provided.

An advantage of this fluid lens construction is that when thermal changes in the index of refraction of the supporting fluid occurs, the fluid lens produces complementary changes stabilizing the position of the image plane with respect to the chamber and objective.

A further advantage of this invention is that the couple between the chamber on one hand and the optical instrument on the other hand will permit numerous chamber configurations, which configurations can be other than spherical and can be changed to accommodate many preselected optical housings.

An additional advantage of this invention is that for relatively large degrees of telescope motion, equal and opposite optical wedges are generated along the light path between the end of each window and the immersed telescope; a partial chromatic correction results.

An advantage of forming the optical wedges from the glass of the fluid chamber windows is that higher indices of refraction may be used. The inherent limitation of a relatively low index of refraction common with most usable transparent liquids is avoided.

Yet another advantage of forming the optical wedges in the glass window is that light deflection can be made to occur at one window and not at the remaining window. With this configuration more convenient and suitable optic powers can be used for the immersed telescope.

Still another advantage of generating the optic wedges in the glass of the chamber windows is that the effect on a liquid of temperature changes, viscosity changes and surface effects can be minimized. A gaseous fluid, such as in air, can be used.

A further advantage of this invention is that the stabilization is relatively insensitive to translational errors of the telescope along the optic path.

Yet another advantage of this invention is that a telescope of simple construction can be readily designed for being immersed in a fluid filled chamber.

Yet another advantage of one embodiment of this invention is that the surfaces of the window in the chamber as well as some of the lenses of the telescope can all be substantially planar. With this construction optical problems created at the interface between the fluid bath and the window and lenses are minimized.

Still another advantage of the stabilizer of this invention is that it can be mounted at a wide range of locations along the optical axis of the stabilized telescope.

Yet another advantage of the stabilizer of this invention is that it can be easily adapted for use with optical image inversion and displacement devices, and also with relay optics.

Other objects, features, and advantages of this invention will be more apparent after referring to the following specification in conjunction with the attached drawings.

BRIEF DESCRIPTION OF THE DRAWINGS

FIG. 1 is a perspective schematic view of a stabilized telescope in which the fluid coupled stabilizer of this invention is located optically adjacent the objective;

FIG. 2 is an enlarged sectional view of the stabilizer of this invention before vibrational motion;

FIG. 3 is an enlarged sectional view of the stabilizer of this invention during vibrational motion;

FIG. 4 is a perspective schematic view of a stabilized telescope in which the fluid coupled stabilizer of this invention is located optically adjacent the imaging plane or eyepiece;

FIG. 5 is an enlarged sectional view of the stabilizer of FIG. 4 before vibrational motion;

FIG. 6 is an enlarged sectional view of the stabilizer of FIG. 4 during vibrational motion;

FIG. 7 is a stabilizer comprising two stabilizer elements placed in an optical train for stabilization along mutually orthogonal axes in accordance with the principles of this invention;

FIG. 8 is a side elevation section illustrating an immersed telescope stabilizer of this invention before undergoing angular motion;

FIG. 9 illustrates the immersed telescope stabilizer of FIG. 8 after undergoing accidental angular motion, the fluid chamber couple here being designed to maintain the telescope parallel to its original spatial orientation;

FIG. 10 is a side elevation section taken along lines 10—10 of FIG. 8;

FIG. 11 is a side elevation section of an alternate embodiment of this invention;

FIG. 12 is a side elevation section of the stabilizer of FIG. 11 after undergoing accidental angular motion, the fluid couple here being designed to impart telescope motion opposite to the angular motion of the casing;

FIG. 13 is a side elevation section taken along lines 13—13 of FIG. 11;

FIG. 14 is a side elevation of the immersed telescope stabilizer of this invention illustrating its placement interior of a Galilean telescope;

FIG. 15 is a side elevation section of the telescope of FIG. 14 after angular motion has occurred;

FIG. 16 is a side elevation section illustrating an immersed telescope stabilizer having optical wedges generated in mating spherical planoconcave and planoconvex lens pairs, one pair of lenses deflecting light as it enters the stabilizer and the remaining pair of lenses deflecting light as it exits the stabilizer;

FIG. 17 is a side elevation section illustrating an immersed telescope stabilizer in which the rear or exit window of the stabilizer is provided with paired neutral meniscus lenses so as to omit deflection of exiting light; and, FIG. 18 illustrates the case of the stabilizer of FIG. 17 combined to process light received from a telescope coaxially mounted in front of the stabilizer.

FIG. 19 is a side elevation section illustrating an immersed stabilizer device for inverting and displacing an image received from a telescope mounted in front of the stabilizer.

FIG. 20 is a schematic perspective view of the inverter-displacement element of the FIG. 19 embodiment; and FIG. 21 is a side elevation section illustrating an immersed stabilizer device for relaying an image from an image from an objective to an eyepiece.

DESCRIPTION OF THE PREFERRED EMBODIMENTS

Turning now to the drawings, the invention will be described with reference to several alternate embodiments. With reference to FIG. 1, the stabilizer of this invention is illustrated mounted within a 20-power optical train. Typically, an objective A is mounted to converge light onto stabilized mirror B within chamber C. The stabilized light is retrodirected from mirror B onto inverting mirrors D where the light is subsequently imaged at plane E and viewed through eyepiece F. For convenience a negative lens 14 may be placed in the optical path to extend its focal length.

The telescope comprising lenses A, 14 and F is well understood in the art. Without the mirrors B and D this telescope would invert the images received in both their horizontal and vertical parity. Mirror B functions to fold the light path from lens A backwardly and upon itself. Mirrors D serve to displace this light so that it may be conveniently viewed off the optical path between objective A and stabilized mirror B.

In addition to displacing light, mirrors D serve to reinvert the light so that the image as viewed has the same parity as the real world image which is being magnified. Typical mirror 16 deflects the light path downwardly at right angles to the optical axis 20 between objective A and stabilized mirror B. Roof mirrors 18 and 19 retrodirect the light along an optical axis 22 to its imaging plane E. Mirrors 16 on the one hand and 18 and 19 on the other hand serve to provide vertical reinversion of the image. Likewise, roof mirrors 18 and 19 serve to provide horizontal reinversion of the image. Magnified image parity to real world image parity results.

Several important observations about the optical path of the telescope of FIG. 1 can be made. First, mirror 16 will cause a partial blocking of the converging light to image plane E. This effect, however, is not critical where the image is either imaged at a plane E for nonviewing purposes such as camera applications, or alternately where the pupil obstruction caused by mirror 16 at the end of the optical train has a size substantially smaller than the pupil of the human eye.

Additionally, it will be noted that the stabilizer is located at a distance of approximately one third of the focal length, measured from the objective towards the focal plane of the objective. Placement of the stabilizer adjacent the objective enables small mirror movement to produce large corresponding stabilized image movement. This results in less inclination of the image plane E relative to the objective A during stabilizing motion. Further, and as will more fully hereinafter appear, mirror B moves relative to chamber C at a rate which is less than the angular inclination of the chamber.

Referring to FIGS. 2 and 3, the construction and operation of the stabilizer of this invention can be understood. Chamber C is typically cylindrical having cylindrical sidewalls 25 closed at one end by an opaque disk shaped wall 27 and closed at the other end by a transparent disk shaped window 28.

Chamber C is filled with fluid. One fluid which can be used is a transparent fluorocarbon chemical sold under the trademark "FC 48" a product of the Minnesota Mining & Manufacturing Company. This liquid has a density 1.9 times that of water, and an index of refraction of 1.3. Typically, the chamber can be provided with bellows, a balloon or alternately a bubble trap to avoid problems of accumulated gasses in the fluid within the chamber.

Mirror B is typically disk shaped and has an outer diameter which is less than the inside diameter of chamber C. As here illustrated, mirror B is surrounded by cylindrical walls 33 which assist the fluid coupling between chamber C and the mirror B.

Several important observations about the fluid coupling between the mirror B on one hand and the chamber C on the other hand can be made. First, it will be noted that chamber C has a ratio where the diameter exceeds the distance between the two disc-shaped end walls. This ratio wherein the diameter exceeds the distance between the two disc-shaped end walls is a fraction of the case movemet (see FIG. 3).

Secondly, the couple between the fluid and casing C is here effected primarily by the hydrostatic pressures which can develop in the vicinity of the right angles between the disks 27 and disk-shaped window 28 and the cylindrical sidewalls 25. It will be apparent to those skilled in fluid art that skin friction between the fluid and the sidewalls of the casing also effects this fluid couple.

Likewise, the couple between the fluid and mirror B will occur through contact of the fluid on both sides of mirror B and with cylindrical sidewalls 33. This couple additionally will be modified by the skin frictions between the fluid and mirror assembly.

It should immediately be apparent that the fluid coupling between the chamber C on one hand and the mirror B on the other hand can be accomplished in numerous ways. For example, the walls of chamber C could be provided with baffles, screens, and the like so that the chamber sidewalls when angularly moved couple to the fluid in varying degrees through pressure effects and shear effects. Likewise, the couple between the mirror B and the fluid can be effected in many ways. For example, the mirror or its cylindrical sidewalls 33 can be perforated, provided with baffles have screens mounted thereto, or the like.

Additionally, the viscosity and density of the particular fluid used to support mirror B within the fluid will also be a factor. Thus, it will be seen that by the selection of chamber shape and configuration, mirror shape and configuration and supporting fluid viscosity and density the couple between the mirror B and chamber C can be varied.

Mirror B is typically supported on an elastic or tensioned thread 37 attached and extended axially of chamber C. The thread 37 here used is sold under the trademark "ELASTEX," a registered trademark of David Traum, Inc., of New York. This elastic with thread coating removed is a rubber compound which has heat and chemical resistent properties and is inert with respect to the fluid 30.

Mirror B at the central portion of its disk is pierced normally by a fastened tube 40. Tube 40 in turn is fastened to elastic 37 midway between disk shaped endwall 27 and disk-shaped window 28. Supportive cylinders 41 and 42 enclose the elastic to further position the mirror and arrest mirror sag when thermal fluid density changes occur.

Referring briefly to FIG. 3, the function of tube 40 can be immediately understood. When mirror B is tilted an angle $\theta$ with respect to chamber C, as illustrated in FIG. 3, tube 40 stretches elastic 37. The elastic as stretched applies a small bias or correcting force to mirror B tending to return it to its original alignment to disk shaped window 28. When the optical instrument is panned, the restoring force exerted by elastic 37 and tube 40 on mirror B enables the mirror to move in the direction of an object being viewed. The fluid provides a lossy coupling damping out oscillation of the mirror on the elastic. The lossy coupling provided by the fluid is capable of damping out unwanted modes of oscillation of the mirror and thus little effect on the desired modes of oscillation of the mirror.

It will be noted that mirror B at its point of attachment is preferably fixed to elastic 37 midway between disk-shaped wall 27 and disk-shaped window 28. This positioning of the mirror on the elastic prevents the mirror from being translated at tube 40 along the window 28 during angular motion of the chamber C.

Several observations about the construction of mirror B and its attached sidewall 33 can be made. First, the mirror is constructed with an overall density which is the same as that of the supporting fluid. The weight of the mirror is thus equal and opposite to the floatation of the mirror which thereby largely nullifies the effect of gravity for the mirror assembly.

Additionally, both the center of floatation and center of gravity of the mirror are located coincident with the center of tube 40 mounted to the mirror. This concentricity of the center of gravity and center of floatation prevents floatation forces from being exerted on the mirror which might cause its angular displacement with respect to the case, particularly when the density of the fluid changes with temperature variations.

Referring to FIG. 2 the reflection of light from mirror B can be illustrated. In FIG. 2 an incident light ray 45 is shown passing normal to the surface of mirror B. The light passes through disk shaped window 28 onto the surface of mirror B where it is reflected. When reflected as reflected ray 55, the light is retrodirected along its original path. Since the light is here shown substantially normal to window 28 and mirror B, no appreciable angular deflection due to refraction or reflection is present.

Referring to FIG. 3, it will be seen that chamber C has been angularly deflected by an angle $\Phi$. As the chamber is fixed to the stabilized optic instrument, angle $\Phi$ will be equal to the angular vibrational movement of the chamber.

Because of the particular fluid couple between the chamber C and mirror B, mirror B has moved to a new angular orientation $\theta$ with respect to chamber C. This angular orientation $\theta$ will result in the angle between the incident ray and the reflected ray being altered by an amount of $2n\theta$ from the case where the mirror would be rigidly attached to the chamber where n is the refraction of the fluid in the chamber.

If the mirror had moved with the chamber, a difference in the angle of incidence and reflection would have occurred equal to $2\theta$. However, mirror movement and fluid index of refraction n have changed this by $2n\theta$. Hence, the difference between the angle of incidence and the angle of reflection will be $2n\theta - 2\theta$ as shown on FIG. 3.

Having set forth the relationship between the incident and reflected rays on the mirror or stabilizer, the relationship of the remainder of the optics of this invention can be easily understood. Typically, the stabilizer is placed in the optical instrument of this invention to satisfy the equation:

$$2n\theta \times D_I = \phi \times F_1$$

where $D_I$ is the distance between the stabilizer and the focal point of the optical system being stabilized, and $F_1$ is the focal length of the optical system being stabilized. It should be noted that optics following the mirror B and towards the image plane will not affect these values.

Analysis of the above equation will immediately indicate that all of the equation variables will be known for a particular design save and except for the desired function of $\theta$, that is the angle multiplier produced between the motion of the case on one hand and the motion of the mirror on the other hand. In the case of the mirror and fluid of the preferred embodiment of the 20-power optical instrument illustrated in FIGS. 1-3 where the mirror is located at a distance of one-third between the objective and its focus, the desired fluid couple multiplier $\theta$ will be 0.577 for $n = 1.3$.

It should be appreciated that the equation set forth above is for camera stabilization. It should be understood, to anyone having ordinary skill in the art that with a modification of:

$$2n\theta \times D_I (\phi \times F_1) \times [1 \pm (1/M)]$$

to the above equation, eye stabilization can be achieved. In the above equation M is the overall magnification of the optical train. Such a modification is disclosed in U.S. Pat. No. 3,473,861, issued Oct. 21, 1969, entitled "Accidental-Motion Compensation for Optical Devices".

Further, it should be noted that the stabilizer can be located in front of the objective. While this is not always desirable, it is a possible embodiment of this invention.

It should be understood that the mirror B used with this invention can be other than flat. For instance, the mirror shown in FIGS. 1-3 could be dished as in a catadioptric optical system. Dishing of the mirror would merely affect the focal length $F_1$ of the objective system; all other parameters of the above equation would remain unchanged.

Having set forth the relation between the incident and reflective light rays, and the relation of the stabilizer to the optical path, it will now be convenient to discuss the athermalization of the optical path of this invention.

It is known that the indexes of refraction of the fluid 30 will vary with respect to the temperature of the fluid bath. Referring to FIGS. 1 and 3, when the temperature of the fluid increases the index of refraction will decrease. Conversely when the temperature decreases the index of refraction will increase.

In the example of FIG. 1 when the temperature drops, imaging plane E will move away from objective A and mirror B. This is caused by the increased bending of the reflected converging rays toward a parallel disposition to the optical axis. Conversely, when the temperature increases, imaging plane E will move towards objective A. This is caused by the decreased bending of the converging rays towards a parallel disposition to the optical axis.

Movement of the imaging plane E could be extremely undesirable. Where a hand held optical instrument was used on a cold day, the heat from the viewer's hand could change the effective focal length of the instrument. These changes in focal length would modify the function of the couple between the chamber on one hand and the mirror on the other hand. Optimum stabilization would not be possible. Additionally, continual adjustment of the eyepiece to view an image would be required. All this can be avoided by the athermalization of the optics as illustrated in FIG. 2.

Referring to FIG. 2, it will be seen that disk shaped window 28 at inner surface 60 is provided with a small concavity. This concavity produces a positive lens in the fluid bath 30. Typically this fluid lens is not of such a power to appreciably affect the overall magnification of the optical train. Rather, this lens typically in the range of less than one tenth of a dioptor merely serves to place an optical correction between the incident ray 45 and the reflected ray 55 which is equal and opposite to that which would be produced by the change in the index of refraction of the liquid layer alone. Thus, where the temperature increases and the focal plane moves towards the objective, there will result at the positive fluid lens a decreasing convergence. This decreasing convergence will oppose the image plane movement and result in the image plane remaining the same distance from the stabilizer.

Conversely, when the temperature decreases and the focal plane moves away from the objective, there will result at the positive fluid lens an increasing convergence. This increasing convergence will also oppose the image plane movement and result in the image plane remaining the same distance to the stabilizer.

The interface between the positive fluid lens on one hand and the chamber side of the disk shaped window 28 on the other hand has an additional advantage not immediately apparent. Typically, some light will be reflected at this interface rather than passing through window 28 and the fluid 30 of the bath onto the mirror. This reflected light can interfere with the image ultimately produced and viewed. The concave surface provided at the fluid glass interface causes dispersion of this light. Accordingly, this reflected light reaches the vicinity of the image in a more dispersed or defocused form. Consequently viewing is improved.

It should be noted in passing that the outside surface of window 28 can be given a small lens surface, typically positive. This lens surface is designed to counteract the chromatic dispersion of the positive fluid lens.

Referring to FIG. 4 another embodiment of this invention is illustrated. A folded light path having an objective A, a mirror B, a chamber C', inverting mirrors D, focal plane E and objective F is illustrated. It will be noted in this case, however, that mirror B is placed two-thirds of the distance from objective A to focal plane E. This placement of the mirror B at two-thirds of the focal distance requires a differing chamber configuration as illustrated in FIGS. 5 and 6.

Referring to FIG. 5, the construction of mirror B, elastic 37 and tube 40 is identical to that construction previously illustrated. As distinguished from the construction previously illustrated it will be noted that chamber C' is elongate normal to the plane of mirror B along the axis of its cylinder. Tubes 41 and 42 have been omitted.

This changes the fluid couple between the mirror B and the chamber C' as illustrated in FIG. 6. Referring to FIG. 6, it will be noted when chamber C' is tilted an angle $\Phi$, mirror B tilts with respect to chamber C' an angle $\theta$. This angle $\theta$ is in the opposite direction to the angle $\Phi$ and the angle $\theta$ exceeds angle $\Phi$. Mirror movement with respect to a given orientation in space appears to be in a reverse direction from the movement of chamber C'.

Referring back to FIG. 4, as well as the equation previously illustrated, it will be realized that this type of chamber is best used where it is desired to locate the stabilizer of this invention adjacent the focal plane E of the stabilized instrument. Using the preferred embodiments of fluid and focal lengths illustrated in FIG. 4, it will be seen that mirror B must be tilted at a rate approximately 1.15 times that of the tilt of casings C' for an index of refraction of n = 1.3.

It should be apparent that the stabilizer of this invention can be used with any number of configurations.

The embodiments of this stabilizer illustrated in FIGS. 1-6 have all included two degrees of motion. That is to say, stabilization has been effected at the single stabilizer in components which are orthogonal to the main optical path of this invention. It should be realized that the stabilizing effect of this invention can be achieved by using two mirrors each given one degree of motion relative to mutually orthogonal axes. Such an embodiment is illustrated in FIG. 7.

Referring to FIG. 7, a mirror $B_1$ is shown supported within a chamber K. Chamber K includes a first window 101 and a second (normal) window 102 here shown normal to window 101 which together form a roof-like configuration over opaque chamber walls 103, 104, and 105. Typically, the chamber ends are closed by opaque walls (not shown) to both contain fluid within the chamber and to provide a pivot point for the mirror $B_1$ which is mounted within the chamber.

Typically, mirror $B_1$ is pivoted about an axis 107 which is here parallel to the planes of the windows 101 and 102. The mirror, as pivoted about this axis, is biased in a neutral position which is here inclined at an angle of 45° with respect to both windows 101 and 102. It should be realized, that by adjustment of the shape and configuration of chamber K relative to the shape and configuration of mirror $B_1$ a desired fluid couple in one orthogonal axis relative to the optical path can be produced.

Light 112 typically will be incident upon mirror $B_1$ through window 101 and will exit the stabilizer chamber K at window 102. The light then will be reflected to a path 114 which is perpendicular to the pivot axis of mirror $B_1$ and the incoming light 112 to mirror $B_1$. Further reflection will occur by means of mirror 115 positioned along the optical path. Light passing along path 116 and into chamber L will impinge upon a stabilized mirror $B_2$ pivotal along an axis 117 orthogonal to the axis of mirror $B_1$ and thereafter exit the chamber along path 120. As exiting from chamber L along path 120 and reflecting from mirror 118, the light will be completely stabilized.

It should be realized that the configuration of chamber L and the configuration of its mirror $B_2$ will generally be different from the configuration of chamber K and its mirror $B_1$. This difference in construction will be designed to slightly alter the fluid couple between the mirror and chamber to make adjustment for the distance between each stabilizer and the imaging plane of the optical path.

The stabilizer embodiment illustrated in FIG. 7 additionally has advantages which may not immediately be apparent. For example, it will be observed that paired optical paths could impinge upon both mirrors $B_1$ and mirrors $B_2$ at spaced apart locations. Such paired optical paths, if of the same focal lengths, and of the same distance from their respective imaging planes could have exact duplicate stabilizing effects applied to them. Thus, with the configuration shown in FIG. 7, the stabilization of paired optical paths for binoculars and the like can be possible.

FIGS. 8-10 illustrate another embodiment of the invention. Fluid-tight chamber C is illustrated having windows $W_1$ and $W_2$ defining a light path L therethrough. Mounted interior of the light path L by a gimbal mount G is a telescope T biased in alignment to a neutral position by magnets $O_1$, $O_2$, $O_3$ and $O_4$ to receive and emit light passing between window $W_1$ and $W_2$. Fluid F fills chamber C and typically provides neutral buoyant support to telescope T. Additionally, fluid F will provide a fluid couple between the sidewalls of the chamber C and the sidewalls of the telescope T. When this fluid couple is combined with the bias provided by the magnets, a controlled movement of the immersed telescope T can be achieved. This movement when deflecting light path L through the optics of telescope T and focusing lens Q onto image plane I will result in a camera stabilized image. Such stabilization is schematically illustrated in the view of FIG. 9.

Chamber C has a cylindrical section 132 extending between two disc-shaped end walls 134 and 136. Walls 134 and 136 are fastened over the ends of the cylinder 132 so as to form a fluid-tight compartment.

Each of the walls 134 and 136 has as a part of the wall a window $W_1$ (in the case of wall 134) and a window $W_2$ (in the case of wall 136). As here illustrated, windows $W_1$ and $W_2$ define portions of the chamber permitting the light path L to pass interior of the chamber at window $W_1$ and exterior of the chamber at window $W_2$.

Fluid F contained within the chamber is typically a transparent liquid having an index of refraction of approximately 1.3. Additionally, this liquid is chosen to have a wide liquid state under all temperatures of expected operation. For example, the above-noted transparent fluorocarbon chemical sold under the trademark "FC48" which has a density 1.9 times that of water and an index of refraction of 1.3, has been found to provide excellent results. As noted above in the discussion of the FIG. 1 embodiments, the chamber can be provided with bellows, a balloon, or alternatively a bubble trap to avoid problems of accumulated gases of the fluid within the chamber.

Telescope T is here illustrated as a Galilean telescope having a positive lens 140, a negative lens 142 and an overall magnification of approximately 4 power. The telescope is affixed to a cylinder 144 and typically is not filled with the fluid F of the bath. In construction, the telescope T is designed preferably for neutral buoyancy with respect to fluid F.

Telescope T is typically affixed to the sidewalls of chamber C by a system of gimbals G. Referring to FIG. 10, it can be seen that paired shafts 145 hold outer gimbal ring 146 and permit pivotal motion of the gimbal ring 146 along the axis defined by shaft 145. Similarly, shafts 148 hold telescope T along an axis orthogonal to the axis defined by shaft 145. It will thus be seen that telescope T is free to move angularly in two degrees of motion about a point defined by the intersection of the axis of shaft 145 and 148 within the fluid F.

For convenience of illustration, it should be understood that this invention will be illustrated using gimbals G. It should be just as apparent to the reader that any other well-known mechanical substitute permitting angular motion of telescope T with respect to light path L could be used in this invention. Moreover, as this particular optical stabilizer is relatively insensitive to movement of the telescope T along or transverse to the optic axis, it is not required that telescope T be affixed to a particular point along the optic axis within the chamber. Rather, it is merely required that the telescope be disposed to intercept the light path L and to undergo a proportional angular motion as will hereinafter be described. For example, it is not required that the axes of shafts 145 and 148 intersect.

It is necessary that the telescope be biased towards a position where lens 140 will be exposed to window $W_1$, and lens 142 exposed to window $W_2$. Accordingly, magnets $O_1$, $O_2$, $O_3$ and $O_4$ are typically provided surrounding light path L.

Each of the magnets $O_1$ through $O_4$ is typically a ring magnet. Magnets $O_1$ and $O_2$ are polarized for mutual attraction. Likewise, magnets $O_3$ and $O_4$ are polarized for mutual attraction. Thus, it will be understood that in the absence of inertial forces and forces from fluid F, telescope T will normally align itself parallel to light path L.

It should be understood that imaging lens Q, herein illustrated as a positive lens, and imaging plane I are both affixed to chamber C, and move with the chamber when it undergoes angular motion. Telescope T in combination with the windows $W_1$ and $W_2$ and the index of refraction n of fluid F maintains the image stationary on imaging plane I despite angular movement of chamber C.

Referring to FIG. 9, the immersed telescope stabilizer of this invention is shown being subjected to angular motion. To understand this angular motion, several preliminary observations can be made.

First, it will be understood that telescope T as mounted on gimbals G is placed within a telescope chamber having a substantially square cross section along a longitudinal axis parallel to the optic axis. It has been found that with such a square cross section, telescope T will tend to maintain an unchanged orientation in space while chamber C undergoes a changing orientation in space.

Motion of telescope T will occur due to the fluid couple between the sidewalls of chamber C and the exterior surface of telescope T. Naturally, the surfaces on the telescope and chamber effecting the couple could be the lens surfaces and window surfaces respectively.

Moreover, it will be understood that windows $W_1$ and $W_2$ and the interface of fluid F adjacent to them are planar. Thus, a refractive effect of the window-fluid interface will occur.

Assuming that chamber C undergoes tilt of an angle $\theta$ due to accidental angular motion, the passage of light through the stabilizer can be algebraically described. Since fluid F is more optically dense than a standard atmosphere, light entering fluid F will be refracted to an angle $\theta/n$ with reference to the normal to the window where $\theta$ is the angle of chamber tilt and n is the index of refraction of fluid F. It should be understood that since only relatively small angles of deflection of the chamber C will, as a practical matter, occur, the expression of $\theta$ in radians will normally be acceptable rather than the more formal sine function used in gross refractions of light.

The light of path L will be deflected in fluid F from its original angular course according to the equation $\theta - \theta/n$.

Assuming that telescope T has a magnification of M, the deflection of the light ray incident upon window $W_1$ when exiting the telescope T will be $M(\theta - \theta/n)$.

It will be understood for purposes of camera stabilization that the angular deflection of the light path L from the incident ray on window $W_1$ should be equal to $\theta$, thus the desired deflection result can be expressed $\theta - [M(\theta - \theta/n] = 0$.

Cancelling out $\theta$ and reducing the equation to its simplest form it will be seen that the relationship of telescope magnification M to the index of refraction n of the fluid F within the bath becomes $(M-1)(n-1) = 1$.

Referring to equation $(M-1)(n-1) = 1$, several observations can be made. First of all it should be apparent that the magnification M of telescope T must be other than 1. Further, the index of refraction n of fluid F must also be other than 1.

Substituting (approximately) into the equation above it will be seen that an index of refraction of 1.3 combined with an optical power of telescope T of positive power of 4 will result in a working optical device effecting the desired stabilization.

Moreover, it will be noted that as the index of refraction n approaches unity, the magnification M must be of higher power. Conversely as the magnification M approached unity, the index of refraction n must be of higher power. Because of these variable relationships it has been found that a telescope T having a magnification in the range of approximately a positive power of 4 is preferred.

It should be understood that the example used in FIG. 8 utilizes a stabilized telescope in combination with the index of refraction n of a fluid F to produce stabilizing motion. Naturally, if telescope T is not stationary with respect to a point in space, but rather undergoes some movement within a chamber C which is proportional to but not the same as motion of the case, the equations set forth thus far must be modified. This may be specifically illustrated with respect to the example shown in FIGS. 11-13.

Referring to these Figures, it will be seen that a chamber $C_1$ has been constructed which has an elongated rectangular section, the elongation occuring parallel to the light path L between window $W_1$ and window $W_2$. It has been empirically found that with this type of chamber configuration, telescope T moves opposite to the inclination of the chamber $C_1$. As chamber $C_1$ is rotated by accidental angular motion in a first direction, telescope T tends to rotate not with the chamber but rather in a direction opposite to the motion of the chamber. To encourage this retrograde motion two angular baffles 151 and 152 are attached to the cylindrical surface of telescope T. The baffles increase the fluid coupling between the fluid F moving along the cylindrical sidewalls 132 and the telescope T.

This angular motion will admit of a rather simple algebraic modification to the equation already set forth.

Assuming that chamber $C_1$ is tilted at angle $\theta$, telescope T will tip with respect to chamber $C_1$ an angle $\theta$ as the movement of the telescope with respect to the chamber will, for the most part, be proportional to the chamber angular movement for the relatively minor angular deviations caused by accidental angular motion.

Assuming that light L is incident on window $W_1$ at an angle $\phi$, it will be deflected towards the optical axis passing through the chamber by the amount $\phi/n$ where $\phi$ is the angle of chamber tilt and n is the index of refraction of fluid bath F. Thus, the light path L interior of the fluid F will be deflected from its original course by an angle $\phi - \phi/n$.

Typically, light will be incident upon telescope T at an angle $(\theta - \phi/n)$ where $\theta$ is the movement of the telescope with respect to its original angular orientation within casing $C_1$. In passing through telescope T the deflection of the light will be equal to $M(\theta - \phi/n)$ where M is the magnification of the telescope T. Finally, and assuming that camera stabilization is desired at the end of the optic path, it will be seen that the desired deflection of light is equal to $$\left[ \theta - M(\theta - \frac{\phi}{n}) \right] = 0$$

Reducing this equation to itsssimplest form it can be seen that $\theta(M-1) = (M/n)\phi$.

Analyzing the above result it will be apparent that the magnification of the telescope T must be other than 1. Moreover, it will be seen that the equation can be satisfied where the index of refraction equals approximately 2, and the ratio of telescope angular movement $\theta$ to casing angular movement $\phi$ is equal to 1.5.

It will be appreciated that the above description has been for camera stabilization. The image has always been described as impacting the same spot on the image plane. It will be appreciated that where ocular stabilization to the eye is required, modification of the stabilizing formula is required. An illustration of such modification is contained in my above-referenced patent application, Ser. No. 75,965 for "Mirror Stabilizer Having Space Referenced Motion", filed Sept. 28, 1970.

Assuming that the stabilization to be used is to the eye with a total magnification $M_t$, it can be described by the equation $M_t = M \times M_o$, where M is the magnification of the immersed telescope and $M_o$ is the magnification of the ocular optics following the immersed telescope. Light leaving the immersed telescope should be compensated by $(\phi/M_o) 1/n$ and light leaving window $W_2$ should be compensated to an angle of $\phi/M_o$.

This modified the previous equation to the form $$\theta (M - 1) = \phi M/n [1 \pm (1/M_t)].$$

positive

[(+) for inverting optics; and (−) for erect optics]

It should be appreciated that the stabilizer of this invention can be used in various locations along an optical train. For example, where light has been stabilized, downstream optics will not effect stabilization. Such optics are illustrated in FIGS. 14 and 15.

Referring to FIG. 14 a positive lens 160 is mounted to and ahead of casing $C_2$. Window $W_1$ has been provided with a concave configuration when viewed from the exterior of the chamber $C_2$ so as to define a negative fluid lens 162 from fluid F. Similarly, window $W_2$ has been provided with a convex configuration when viewed from the exterior of the chamber. This convex configuration defines a positive fluid lens 164 which is here shown affecting a focus on imaging plate I.

It will be observed that positive lens 160 and negative fluid lens 162 together define a Galilean telescope of magnification $M'$. Assuming that the immersed telescope T includes a magnification of M, it will be seen that the previously defined equation must be modified by the factor $\phi' = \phi M'$ where $\phi$ is the angle of accidental motion of the immersed telescope stabilizer and attached Galilean telescope and $\phi'$ is the angle of the light onto the fluid F before compensation for the index of refraction.

Replacing $\phi$ in the original equations by the new function $\phi'$ will give the result $\theta (M-1) = (MM'/n) \phi$ for camera stabilization and $\phi(M-1) = (MM'/n)\phi [1 \pm (1/M_t)]$ for telescope stabilization.

In each of the foregoing examples it should be noted that all light passing between a window $W_1$ and telescope T and telescope T and window $W_2$ is substantially collimated.

It has been found that reliance upon the fluid bath to deflect light can result in some problems. For example, the indices of refraction of useful transparent liquids are typically relatively low when compared to those of useful transparent glasses. Moreover, viscosity changes and optical changes occurring at the liquid glass interface can interfere with the quality of the optics. Accordingly, and with reference to FIG. 16, an embodiment is illustrated wherein glass windows $W_1$ and $W_2$ can be utilized for this purpose.

With reference to FIG. 16, a chamber is shown defined by a cylindrical sidewall 170 with the window $W_1$ defined from a planoconcave lens 172. Similarly window $W_2$ is defined by a planoconcave lens 173. Lenses 172 and 173 are both positioned with their respective concave sides faced inwardly to define interior of the defined chamber $C_3$ a more or less spherical volume. In this spherical volume there is placed a telescope T.

Telescope T is shown here of the Galilean variety having a planoconvex lens 175 and a planoconcave lens 176. These lenses are in fixed relation interior of telescope T and are typically surrounded by a magnetic ring $O_2$. Complementary to magnetic ring $O_2$ there is a magnetic ring $O_1$ mounted in an interior annular groove in the cylindrical sidewall 170. As will hereinafter appear the complementary rings by their mutual attraction bias immersed telescope T to a neutral position.

Telescope T is mounted to a casing having a planoconvex lens 182 at the forward portion. Lens 182 on its convex surface includes a spherical curvature which is complementary to the spherical curvature of the concave side of planoconcave lens 172.

Similarly, telescope T has attached to its rearward portion a planoconvex lens 183. Planoconvex lens 183 at its convex surface adjacent planoconcave lens 173 has a curvature complementary to the spherically concave side of planoconcave lens 173.

Typically, chamber $C_3$ is filled with fluid. The fluid, lens elements, and air space between the lens elements together with the casing to which they are mounted have the center of gravity and center of floatation of the telescope T all chosen to provide neutral buoyancy and coincidence of the center of gravity and center of floatation. It can thus be seen that with small angular inertial changes, relative movement between the telescope T on one hand and the chamber exterior of the telescope in which it is immersed on the other hand can occur.

As has been described heretofore, relative movement between the telescope on one hand and the chamber on the other hand will be opposed by the bias of the mutually attractive magnetic rings $O_1$ and $O_2$. Thus with all vibrations of relatively high frequency, relative movement between the telescope on one hand and the chamber on the other hand will occur. Conversely, for relatively low frequency vibrational movements, such as those experienced in panning of the optical instrument, alignment of the telescope T to the neutral position with respect to the chamber $C_3$ will occur through the bias supplied by the magnetic forces through rings $O_1$ and $O_2$.

Assuming that lenses 172 and 182 have an index of refraction $n_1$ and lenses 173 and 183 have an index of refraction $n_2$, a general formula can be set forth where the telescope has a power of M. Specifically, this formula is:

$$(n_1 - 1)M - (n_2 - 1) = 1$$

For the case where $n_1 = n_2$ this formula reduces to:

$$(n - 1)(M - 1) = 1$$

This relation is for camera stabilization.

It should be appreciated, that the stabilizer here could be used in combination with a telescope fixed to sidewall 170 of the chamber between an object and window $W_1$. In such a case and assuming that the magnification of the telescope between an object and the window $W_1$ was of the power $M_1$ and the magnification of the immersed telescope was of the power $M_2$ the relation for camera stabilized optics will be:

$$M_2(n_1 - M_1) - (n_2 - 1) = 1$$

It should be noted that in the case of the stabilizer of FIG. 16 both front window $W_1$ and rear window $W_2$ form an active glass wedge interface. Thus, the glass wedges formed by this embodiment are analogous to the fluid wedges formed by the embodiments illustrated in FIGS. 8–15.

Where lenses are used to generate an optical wedge, the lens shape at one of the windows $W_1$ or $W_2$ can be made to neutralize the wedge effect at one end of a chamber. This is specifically illustrated in the case of paired neutral meniscus lenses in the stabilizer of FIG. 17.

Referring to FIG. 17, a cylindrical chamber 171 is illustrated having a frustoconical section 186 reducing its section to a smaller concentric cylindrical end portion 188. Section 186 defines on its inside surface a spherical surface 190 which is complementary to the spherical surface of a meniscus lens 193. As before the telescope T is floated interior of a transparent liquid and designed for neutral buoyancy of the telescope T and coincidence between the center of gravity and center of floatation of the telescope T. It will be seen that with angular displacement between the telescope and chamber in which it is immersed neutral meniscus lens 193 attached to the telescope T and neutral meniscus lens 203 attached to the chamber $C_4$ will not generate an optical wedge effect at the rear of chamber $C_4$ when light passes therethrough.

It should be recognized that neutral meniscus lenses 193 and 203 will have the effect of diverging collimated light passing through the stabilizer. This diverging effect can be compensated for in the optics of telescope T in the selection of the lenses 175 and 176. While downstream optics could be used to effect such a correction, this is not preferred as the stabilizer illustrated here is most useful if it is not dependent upon optics exterior of the stabilizer unit.

Assuming, that in the case of the stabilizer illustrated in FIG. 17, the planoconcave lens 172 forming window $W_1$ and the planoconvex lens 182 attached to the leading portion of telescope T have an indices of refraction n and the immersed telescope includes a magnification of power M, the relation for camera stabilized optics will be:

$$(n - 1)(M) = 1$$

It will be noted that this formula has similarity to the formula expressed for the stabilizer of FIG. 8, the difference being that the function M−1 is replaced by the function M. This difference comes from the fact that an opposite wedge effect is not created at window $W_2$ when light exits the stabilizer.

Referring to FIG. 18, the stabilizer of FIG. 17 is illustrated having a telescope $T_1$ of magnification $M_1$ mounted rigidly to and moveable with the exterior cylindrical casing 170 of the stabilizer. As shown in FIG. 17, a telescope $T_2$ of power $M_2$ is immersed interior of the chamber $C_4$ and functions as previously described.

The condition for camera stabilization action for the system of FIG. 11 can be described as:

$$M_2(n - M_1) = 1$$

The total magnification of the system $M_t$ equals:

$$M_t = M_1 M_2$$

The modification of FIG. 18 has two distinct advantages to the apparatus heretofore illustrated. First, the total power $M_t$ can be made unity so as not to modify the field of view when the attachment is used complementary to other existing optics. Secondly, the powers of the telescope can be much closer to unity as both telescopes tend to aid in the stabilization.

For example, where the apparatus of FIG. 18 is constructed of a very low index, low dispersion glass at lenses 172, 182 in the range 1.517, then for the case $M_t$ = 1.0, $M_1$ can equal 0.759 and $M_2$ can equal 1.32. This specific embodiment has an overall power of unity, and low power telescope optics.

With reference to FIG. 19, another embodiment of the invention is shown in which the optically transmitive element is an image inverting and displacement device. The image inverting and displacement device comprises a compound inverted prism 200 neutrally buoyantly suspended in a fluid-filled chamber 202 within a casing 203 on a gimbal mount 204, which may be similar to that employed in the embodiment described above in connection with FIGS. 8–10. Prism 200 may be biased toward the neutral position shown by a magnetic biasing arrangement similar to that described above, also in connection with FIGS. 8–10. Alternatively, the conventional low friction gimbal bearing mounts may be replaced by resilient interconnecting members constructed of rubber or the like in order to provide a restoring force tending to maintain prism 200 in the neutral position. Other arrangements will occur to those skilled in the art.

Inverter prism 200 is provided with a number of planar reflecting surfaces 205–208 for inverting and displacing an image incident on entry face 210. In the FIG. 19 embodiment, this image is presented to an entry window 212 in the form of a collimated light image by telescope 214 of magnification M attached to the front of casing 203 by any suitable means. The light image passes through the fluid interface between entry window 212 and prism entry face 210, is successively reflected by reflecting surfaces 205–208, and exits via a prism exit face 209 to an exit window 215 through the fluid interface therebetween. After passing through exit window 215, the inverted, displaced light image is focused by an appropriate objective lens 217 to a focal plane 220. Conventional eyepiece 222 is provided for ocular viewing.

As best shown in FIG. 20, light entering inverter prism 200 along a first optical path 224 emerges along a second optical path 225 which is displaced from first path 224. The amount of displacement is dependent upon the dimensions and relative placement of the reflecting surfaces of prism 200 and may be selected in accordance with the requirements of a given application.

The stabilization operation and the relative dimensional design considerations of the FIG. 19 embodiment are similar to that already described above with reference to the immersed telescope embodiments and need not be repeated. The expression for camera stabilization is given by $$M = 2n(\theta/\phi)$$

where M is the magnification of telescope 214, n is the refractive index of the supportive fluid, $\theta$ is the angle between inverter prism 200 and casing 203 and $\phi$ is the angle between the casing axis (measured normal to the surface of windows 212, 215) and the spatial reference axis. For ocular stabilization, this becomes $$M[1\pm(1/M_t)] = 2n(\theta/\phi)$$

where $M_t$ is the total magnification of the system including telescope 214, prism 200 and eyepiece 222, and the remaining variables are as defined above. As noted above in the description relating to immersed telescopes, stabilizer performance is not degraded by translational vibration of inverter prism 200.

With reference to FIG. 21, another embodiment of the invention is shown in which the optically transmitive element is an optical relay 230. Optical relay 230 comprises a pair of lenses 231, 232 mounted at opposite ends of an inner casing 234, and a conventional field lens 235 and field stop 236 mounted interior to casing 234 substantially midway between lenses 231, 232. Optical relay 230 is neutrally buoyantly suspended in a fluid filled chamber 238 comprising an outer casing 240 and a pair of entry, exit windows 242, 244, on a suitable pivotable mount 245 similar to that described above. Optical relay 230 is biased toward the neutral position shown in FIG. 21 in the manner already set forth above.

In the FIG. 21 embodiment a non-parallel light image (illustrated as convergent) from an objective lens 246 is presented to entry window 242. After passing into the interposed fluid, the image is virtually focused at 249. After being re-imaged at virtual focus 248 on the elements of optical relay 230, the emergent non-parallel image from the fluid interposed between lens 232 and exit window 244 is focused by lens 250 onto focal plane 252. It is noted that the images at virtual foci 248, 249 have the same orientation. Conventional eyepiece 254 is provided for ocular viewing.

The stabilization operation and relative dimensional considerations discussed above similarly apply to the FIG. 21 optical relay embodiment. The expression for camera stability is given by $$F = D(\theta/\phi)$$

where F is the focal length of objective lens 246 (indicated at 247 in FIG. 21), D is the distance between the virtual foci 248, 249 (i.e. the image relay distance as measured through the fluid medium), and $\theta$ and $\phi$ are as described above. It is noted that the refractive index n of the supportive fluid appears intrinsically in the above expression in the variable D.

For ocular stabilization, the above expression becomes $$F[1-(1/M_t)] = D(\theta/\phi)$$

where $M_t$ is the total magnification of the system (ratio of the focal length of objective 246 to the focal length of eyepiece 254), and the remaining variables are as described above. It is noted that the FIG. 21 embodiment is a "one-to-one" erect relay system, i.e. one in which the virtual images at foci 248, 249 have the same size and orientation. Thus, even though the system operates on non-parallel light, the image stabilization provided is not degraded by translational vibration of optical relay 230.

As will now be apparent, the invention described above provides image stabilization for a wide variety of optical deflecting devices, including but not limited to mirrors, telescopes, inverters, displacement devices and relays. However, while the above provides a full and complete disclosure of the preferred embodiments of the invention, various modifications, alternate constructions and equivalents may be employed without departing from the true spirit and scope of the invention. For example, other optical devices than those expressly set forth above may be adapted for image stabilization in accordance with the teachings of this invention without departing from the true spirit and scope thereof. Therefore, the above description and illustrations should not be construed as limiting the scope of the invention which is solely defined by the appended claims.

What is claimed is:

1. An optical instrument for stabilizing an image upon being subjected to angular vibrational orientation, said optical instrument comprising: an optical path for receiving light from an object and transmitting light to an imaging plane; a fluid filled chamber within said optic path including first and second windows for permitting the entrance and exit of light from said chamber; optically transmittive means disposed within the optic path interior of said fluid filled chamber for receiving incident rays from said object and transmitting rays to said imaging plane; means for maintaining said optically transmittive means within said optic path interior of said fluid chamber; means for biasing said optically transmittive means to a neutral position; and means in combination with at least one of said windows for generating an optical wedge proportionate to the relative angular displacement between said optically transmittive means and said window.

2. The invention of claim 1 and wherein said means for generating an optical wedge includes a first surface on said window exposed to said path and facing said optically transmittive means, a second surface on said optically transmittive means exposed to said path and faced to said window, said surfaces having a configuration for generating transparent fluid optical wedges proportionate to the angular displacement between said immersed optically transmittive means on one hand and said window on the other hand.

3. The invention of claim 1 and means in combination with both said windows for generating paired optical wedges proportionate to relative angular displacement between said optically transmittive means and said windows.

4. The invention of claim 1 and wherein the other of said windows is a meniscus lens.

* * * * *